United States Patent [19]

Suzuki

[11] Patent Number: 4,871,234
[45] Date of Patent: Oct. 3, 1989

[54] LIQUID CRYSTAL DISPLAY DEVICE
[75] Inventor: Mitsuya Suzuki, Tokyo, Japan
[73] Assignee: Seiko Instruments Inc., Japan
[21] Appl. No.: 325,100
[22] Filed: Mar. 14, 1989

Related U.S. Application Data

[63] Continuation of Ser. No. 249,226, Sep. 22, 1988, abandoned, which is a continuation of Ser. No. 863,199, May 14, 1986, abandoned.

[30] Foreign Application Priority Data

May 15, 1985 [JP] Japan .................................. 60-103141

[51] Int. Cl.$^4$ .......................... G02F 1/13; H01L 45/00
[52] U.S. Cl. .................................. 350/333; 350/334; 357/2; 437/101; 437/181
[58] Field of Search ..................... 350/334, 333; 357/2; 437/101, 181

[56] References Cited

U.S. PATENT DOCUMENTS

| | | | |
|---|---|---|---|
| 3,654,531 | 4/1972 | Krambeck et al. | 357/1 |
| 4,001,762 | 1/1977 | Aoki et al. | 357/59 F |
| 4,223,308 | 9/1980 | Baraff et al. | 340/719 |
| 4,240,710 | 12/1980 | Kozaki et al. | 350/339 |
| 4,389,095 | 6/1983 | Teshima et al. | 350/336 |
| 4,413,883 | 11/1983 | Baraff et al. | 350/334 |
| 4,534,623 | 8/1985 | Araki | 350/333 X |
| 4,572,615 | 2/1986 | Nickol et al. | 350/334 |
| 4,583,087 | 4/1986 | Venne | 357/45 |
| 4,589,733 | 5/1986 | Yaniv et al. | 350/332 |
| 4,597,162 | 7/1986 | Johnson et al. | 357/2 |
| 4,683,183 | 2/1987 | Ono | 350/333 X |
| 4,712,872 | 12/1987 | Kanbe et al. | 350/333 |

FOREIGN PATENT DOCUMENTS

| | | |
|---|---|---|
| 0122659 | 10/1984 | European Pat. Off. . |
| 0174431 | 3/1986 | European Pat. Off. . |
| 2460916 | 7/1975 | Fed. Rep. of Germany . |
| 2050031 | 12/1980 | United Kingdom . |

OTHER PUBLICATIONS

Szydlo et al., "New Amoyilious Silicon Nonlinear Element for Liquid Crystal Display Addressing", Appl. Phys. Letts., vol. 44, No. 2, Jan. 15, 1984.
Togashi et al., "An LC-TV Display Controlled by a-si Diode Rings", Proc. SID, vol. 26/1, 1985, pp. 9–15.
Castleberry, 1980 Biennial Display Research Conference, "Control Layers for Liquid Crystal Matrix Displays".
Sutherland et al., "Switching Effects in Metal Insulator Metal Thin Film Devices", Thin Solid Films, vol. 6, No. 4 (1970), pp. R39–R42.
J. Appl. Phys. , vol. 54, No. 10, Oct. 1983, pp. 5801–5827, D. J. DiMaria et al., "Charge Transport and Trapping Phenomena in Off-Stoichiometric Silicon Dioxide Films".
J. Appl. Phys., vol. 51, No. 5, May 1980, pp. 2722–2735, D. J. DiMaria et al., "High Current Injection into $SiO_2$ from Si Rich $SiO_2$ Films and Experimental Applications".
Applied Physics Letters., vol. 46, No. 9, May 1985, pp. 879–881, M. Miyake et al., "Conductive Layer Formation by High-Dose Si Ion Implantation into $SiO_2$".
IBM Technical Disclosure Bulletin, vol. 14, No. 5, Oct. 1971, Liquid Crystal Display Devices, G. L. Gladstone & V. Sadagopan.

Primary Examiner—Stanley D. Miller
Assistant Examiner—Huy K. Mai
Attorney, Agent, or Firm—Bruce L. Adams; Van C. Wilks

[57] ABSTRACT

An electro-optical device has a plurality of electro-optical elements arranged in a matrix and optically activated selectively in response to voltage pulses applied thereto. Each electro-optical element is comprised of first and second electrode layers opposed to each other for selectively receiving thereacross a voltage pulse, and a third electrode layer adjacent to the first electrode layer and in opposed relation to the second electrode layer. A liquid crystal layer is interposed between the second and third electrode layers and optically activated when electrically charged through the third electrode layer. A non-linear-resistive layer is disposed between the first and third electrode layers and operative when the voltage pulse is applied across the first and second electrode layers to increase its electro-conductivity for electrically connecting the first electrode layer to the third electrode layer to thereby electrically charge the liquid crystal layer in response to the voltage pulse. The non-linear-resistive layer is comprised of non-stoichiometric silicon oxide or silicon nitride.

49 Claims, 5 Drawing Sheets

LIQUID CRYSTAL DISPLAY DEVICE

This is a Rule 62 continuation of application Ser. No. 249,226 filed Sept. 22, 1988, which in turn is a Rule 62 continuation of application Ser. No. 863,199 filed May 14, 1986.

BACKGROUND OF THE INVENTION

This invention relates generally to a liquid crystal display device having a large number of pixels that is used for the display panel of measuring instruments, the instrumental panel of cars, personal computer image displays, television receivers, and so forth.

Liquid crystal display devices have been put into practical application as a kind of display which is compact in scale and light in weight and consumes less power. Among the liquid crystal display devices of this kind, an active matrix liquid crystal display device using thin film transistors having three terminals or MOS transistors formed on a single crystal silicon and an active matrix liquid crystal display device using non-linear resistance elements having two terminals and connected in series with each liquid crystal pixel have drawn an increasing attention in recent years view of display capacity.

In comparison with the active matrix having 3-terminal devices, the active matrix having 2-terminal devices has a smaller number of films to be formed and a smaller number of photoetching steps to be conducted and needs relatively rough patterning accuracy. Therefore, this type can be applied to a low cost display device having a large display area.

The following systems are known for the active matrix liquid crystal display having 2-terminal devices.
(1) varistor system
(2) metal-insulating film-metal (MIM) system
(3) diode system The varistor system (1) and the MIM system (2) are disclosed in Japanese Patent Laid-Open No. 105285/1980 and Japanese Patent Laid-Open No. 161273/1980, respectively. The operation system of the active matrix liquid crystal display device having the 2-terminal devices will be described with reference to the MIM system by way of example.

FIG. 9 of the accompanying drawings is a longitudinal sectional view of a heretofore known liquid crystal display device using the MIM type non-linear resistance elements of the system (2). The drawing illustrates only one pixel. FIG. 10 is a circuit diagram of a liquid crystal panel having a large number of row and column electrodes using the heretofore known non-linear resistance elements.

Referring to FIG. 9, reference numerals 90 and 91 represent upper and lower transparent substrates, 92 is a liquid crystal layer, 93 is a display transparent electrode for the upper substrate and 94 is a metallic tantalum electrode for the lower substrate.

The transparent electrode 93 and the metallic tantalum electrode 94 together form row and column electrodes, each consisting of more than 100 number of electrodes. Reference numeral 95 represents a display pixel electrode and reference numeral 96 is an insulating film formed by anodic oxidation of the metallic tantalum electrode 94. MIM consists of the electrode 94, the insulating film 96 and the electrode 95.

FIG. 10 is an equivalent circuit diagram of a liquid crystal display device having the sectional structure shown in FIG. 9. Reference numeral 100 represents the row electrode groups and 101 represents the column electrode groups. A liquid crystal 102 and a non-linear resistance element 103 connected in series to each other are formed at the point of intersection of each row electrode and each column electrode.

The principle of operation of the liquid crystal panel of this kind can be understood as follows. An ordinary simple matrix drive method is such that a large number of row electrodes 100 shown in FIG. 10 are selected line by line from the upper line, and the data is written by the column electrodes 101 during this selection period. The voltage levels to be applied to the row and column electrodes are determined by a system which is generally referred to as a "voltage averaging method". This method is applied to the panel having the non-linear resistance elements shown in FIG. 10, and a bias method of from ⅓ to 1/15 is employed.

FIG. 11a is an equivalent circuit diagram of one known pixel, and a non-linear resistance element and a liquid crystal are shown connected in series with each other. Symbol $C_{LC}$ represents the capacity of the liquid crystal, $R_{LC}$ is the resistance thereof, and $C_I$ is the capacity of the non-linear resistance element and $R_I$ is the resistance thereof. The resistance $R_I$ is a function of a voltage. FIGS. 11b and 11c show the waveforms of voltages applied to the pixel when it is turned on and the waveforms are heretofore known. Solid line represents the waveform of the voltage impressed upon the pixel, and this voltage is practically applied between the point A and the point C in FIG. 11a. Broken line represents the waveform of the voltage at the point B in FIG. 11a. Therefore, the hatched portions in FIGS. 11b and 11c represent the effective voltage applied to the liquid crystal.

In order to obtain a liquid crystal display operation having sufficient contrast, the effective voltage applied to the liquid crystal at the time of turn-on must be greater than the sum voltage $V_{SAT}$ of the liquid crystal, the effective voltage applied to the liquid crystal at the time of turnoff must be lower than the threshold voltage $V_{TH}$ of the liquid crystal and at the same time, the value of the resistance $R_I$ in the non-selection period is at least equal to the value of the resistance of the liquid crystal. In other words, the time constant $\tau_1$ for writing or electrical charging at the time of turn-on, the time constant $\tau_2$ for holding the electric charge and the time constant $\tau_3$ for inhibiting the write can be expressed by the following equation (1) through (3). Here, the capacity of the liquid crystal is assumed to be $5 \times 10^{-13}$F.

$$5 \times 10^{-6} < \tau_1 < 1 \times 10^{-4} \tag{1}$$

$$1.6 \times 10^{-3} < \tau_2 \tag{2}$$

$$\tau_3 > 1 \times 10^{-4} \tag{3}$$

where $$\begin{cases} \tau_1 = R_I(V_{ON})C_{LC} \ (V_{ON}\text{: turn-on voltage}) \\ \tau_2 = R_I(V_{NON})R_{LC}C_{LC}/[R_I(V_{NON}) + R_{LC}] \\ (V_{NON}\text{: voltage during non-selection period}) \\ \tau_3 = R_I(V_{OFF})C_{LC} \ (V_{OFF}\text{: turn-off voltage}) \end{cases}$$

Therefore, $$10^7 < R_I(V_{ON}) < 2 \times 10^8 \quad (4)$$

$$3 \times 10^9 < R_I(V_{NON})R_{LC}/[R_I(V_{NON}) + R_{LC}] \quad (5)$$

$$R_I(V_{OFF}) > 2 \times 10^8 \quad (6)$$

Generally, the relation $C_I < C_{LC}/5$ must be satisfied in order to apply a sufficient voltage to the non-linear resistance element where $C_I$ represents the capacity of the non-linear resistance element.

In the conventional MIM system using the insulating film for the non-linear resistance element, the insulating film 96 shown in FIG. 9 must have a thickness from 100 to 600 Å.

From the restrictive condition of the capacity ratio $C_I \leq C_{LC}/5$ between the non-linear resistance element and the liquid crystal, the overlap area of the non-linear resistance element with the upper and lower electrodes must be at most about 6 μm × 6 μm, and the density of a current flowing through this portion is at least 5 A/cm² from equation (4).

In the liquid crystal display of this kind wherein the insulating film 96 has the thickness from 100 to 600 Å, the non-linear resistance element is likely to be broken by the mechanical load that is generated by liquid crystal orientation rubbing treatment. If the materials of the upper and lower substrates constituting the non-linear resistance element are different, non-linearity of the voltage-current characteristics becomes asymmetric with respect to the positive and negative polarity of the impressed voltage due to the difference of the potential barrier between the respective electrodes and the insulating film, so that the liquid crystal panel undergoes rapid degradation if the electro-chemical reaction develops on the interface between the liquid crystal layer and the electrodes. In order to prevent this problem, the electrodes made of the same material must be used, so that the number of photoetching steps increases, the number of photomasks to be used is at least 4 and eventually, the production cost of the panel becomes higher.

This also holds true of the liquid crystal display device using diodes as the non-linear resistance elements. When varistors having a composition ZnO is used, ZnO must be at least 25 μm thick and the sintering temperature during its production process must be at least 500° C. In addition, an etching step of an extremely thick film is necessary, and a driving voltage must be as high as at least 30 V.

The problems of the prior art described above can be summarized as follows.

Fine etching step below 6 μm is required, and a display having a size of above A4 becomes difficult to produce.

The number of photoetching processes becomes at least 3, and the probability of occurrence of defects becomes higher as much. In addition, the production cost becomes also higher due to the increase in the number of production steps.

Since the non-linear resistance film is below 600 Å thick, MIM likely to be broken at the time of rubbing in the liquid crystal orientation treatment.

The metal electrodes constituting MIM must have an electrically symmetric structure, and to this end, the same metal must be laminated and hence the number of production steps increases.

When diodes are used as the non-linear resistance elements, at least two diodes must be disposed either parallel or in series for each pixel in order to obtain the same voltage-v-current characteristics in both forward and backward directions. Therefore, the number of the production steps and the ratio of occurrence of defects increase.

Varistors using ZnO requires a thick film and a high sintering temperature. Therefore, it becomes difficult to make flat the substrate surface and the number of production steps increase.

SUMMARY OF THE INVENTION

It is an object of the present invention to provide a liquid crystal display device using novel non-linear resistance elements which is different from the heretofore known systems using MIM, diodes and ZnO varistors.

In order to solve the problems described above, the present invention uses as the non-linear resistance elements hydrogen-containing amorphous silicon or an amorphous material having a silicon content greater than a stoichiometric ratio, such as a silicon oxide film, a silicon nitride film or silicon oxide nitride film so as to form the non-linear resistance element between conductors. When the amorphous material consisting of silicon as the principal or primary component is sandwiched between the conductors, its film thickness is from 400 Å to 10,000 Å. In the case of a planar structure wherein the amorphous material is formed in a horizontal direction between the conductors such as shown in FIG. 8, the film thickness is 10,000 Å.

The inventor of the present invention has confirmed experimentally that if the current-v-field intensity of the non-linear resistance element is expressed by equation (7), the non-linear coefficient α assumes a value of from about 3 to about 20:

$$I = K \, I \times d \, (\alpha E) \quad (7)$$

where:
I: current
K: constant
α: non-linear coefficient
E: field intensity $10^6$ V/cm In other words, this result means that if the non-linear resistance element of the present invention is used, the overlap area between the conductor-the amorphous material-the conductor can be made to about 100 μm² to 1,000 μm². The electric characteristics of the non-linear resistance element of the present invention does not depend upon the electrode material, but has extremely excellent symmetry of voltage-v-current characteristics with respect to the polarity of the voltage impressed upon the electrode. The number of necessary etching steps in the present invention is two or three, and the minimum patterning width at the time of photoetching can be made to 10 μm to 40 μm. Therefore, extremely rough patterning becomes possible. The amorphous material constituting the non-linear resistance element is basically electro-conductive and is ordinarily as thick as at least 1,000 Å. Therefore, the non-linear resistance element is hardly destroyed by rubbing at the time of orientation treatment and has sufficient breakdown voltage to static electricity.

As described above, the present invention needs only extremely simple production steps and can produce a non-linear resistance element with a rough design accuracy of at least 10 μm. Since the scale of the picture surface can be easily increased and a high production yield can be obtained, a liquid crystal device using novel non-linear resistance elements can be obtained.

DETAILED DESCRIPTION OF PREFERRED EMBODIMENTS

Figure 1A:
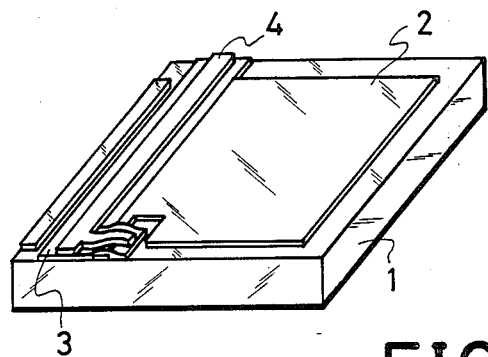
FIG. 1a is a perspective view showing the electrode structure of a liquid crystal display device in accordance with one embodiment of the present invention.

FIG. 1a is a perspective view of a substrate on which a non-linear resistance element used for a liquid display device in accordance with the present invention is formed. This figure illustrates only one pixel, and a liquid crystal layer, another substrate opposed to the substrate for holding the liquid crystal layer and a polarizer are omitted from the drawing for ease of illustration.

Figure 1B:
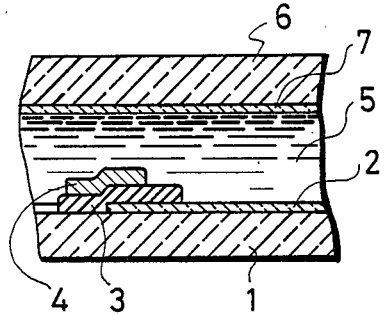
FIG. 1b is a longitudinal sectional view of the liquid crystal display device of the invention.

FIG. 1b is a longitudinal sectional view of one pixel of the liquid crystal display device in accordance with the present invention, and a polarizer is omitted from the drawing. In FIG. 1a, reference numeral 1 represents a substrate made of transparent glass, and ordinary glass is used. Reference numeral 2 represents a transparent conductive film which has a thickness from about 100 Å to 500 Å and is formed by magnetron sputtering of an indium tin oxide (ITO) film. Photoetching is used for the pattern shaping. Reference numeral 3 represents an amorphous material film consisting principally or primarily of silicon. In the case of a $SiO_x$ film, the film 3 is formed by plasma CVD using a mixed gas of silane gas, carbonic acid gas, nitrogen suboxide gas and oxygen gas. In the case of a silicon nitride film, the film 3 is formed by plasma CVD using a mixed gas of silane gas in combination with ammonia gas and nitrogen gas.

Reference numeral 4 represents a metal electrode which is one of the row and column electrodes. In this embodiment, the metal electrode 4 is formed in a thickness of about 3,000 Å by sputtering metallic chromium. Besides chromium, it is possible to use Al, Cu, NiCr, Ag, Au and Ta. Next, the metal electrode 4 is selectively removed by photoetching, and while a photosensitive resin is not removed, the amorphous film 3 consisting principally of silicon is selectively etched. As a result, the non-linear resistance element is produced by the two photomask steps and the three etching steps. In FIG. 1b, reference numeral 5 represents a liquid crystal layer, which is about 7 μm thick, and uses a twist nematic liquid crystal material. Reference numeral 6 represents an upper transparent substrate, which is made of ordinary glass. Reference numeral 7 represents a transparent conductive film ITO formed on the upper transparent substrate, which is used either as the row electrode or as the column electrode.

Figure 2:
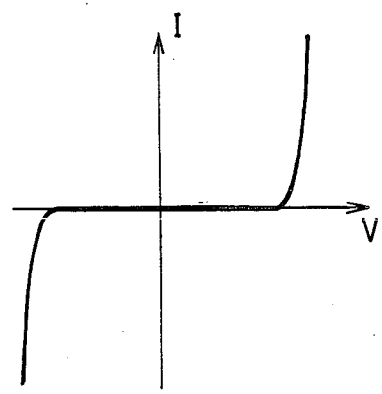
FIG. 2 is a current-v-voltage characteristics diagram of a non-linear resistance element used in invention.

FIG. 2 shows the current-v-voltage characteristics of the amorphous film 3 which consists principally of silicon and is formed by the method described above. The diagram shows the case where one of the electrodes is made of the metallic chromium and the other is made of ITO. As can be seen, the current-v-voltage characteristics exhibit extremely excellent symmetry.

Figure 3A:
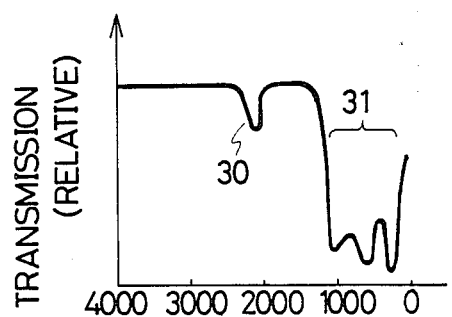
FIGS. 3a and 3b are diagrams showing the infrared absorption characteristics of $SiO_x$ film and silicon nitride film used in the liquid crystal display device of the present invention, respectively.

FIG. 3a is a diagram showing the infrared absorption characteristics of the amorphous silicon film formed by the plasma CVD method using a mixed gas of silane gas and nitrogen suboxide gas.

In FIG. 3a, reference numeral 30 represents the infrared absorption peak resulting from the Si-H bond around a wave number 2,100 $cm^{-1}$.

Reference numeral 31 in FIG. 3a represents the infrared absorption peaks resulting from the Si-O bond around wave numbers 1050 $cm^{-1}$ and 800~900 $cm^{-1}$, respectively. As a result of calculation from the absorption peak of the Si-H bond, the hydrogen content of the amorphous silicon film is found to be from $10^{21}$ to $10^{22}$ pcs/$cm^3$.

Figure 3B:
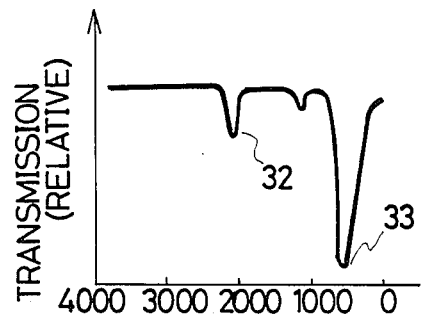

FIG. 3b is a diagram showing the infrared absorption characteristics of an amorphous material film formed by plasma CVD using a mixed gas of silane gas and ammonia gas or nitrogen gas. Reference numeral 32 in FIG. 3b represents the infrared absorption peak around 2100 $cm^{-1}$ resulting from the Si-H bond, and reference numeral 33 in FIG. 3b represents a broad absorption peak around 840 $cm^{-1}$ resulting from the Si-N bond. The hydrogen content of the silicon nitride film of this kind is found to be in the range of from $10^{21}$ to $10^{22}$ pcs/$cm^3$.

Figure 4A:
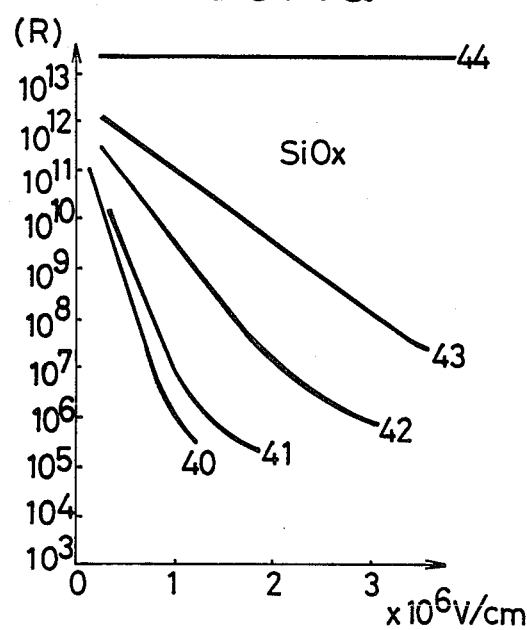
FIGS. 4a and 4b are diagrams showing the R-E characteristics of $SiO_x$ film used in the liquid crystal display device of the present invention and the dependency of the film properties upon the composition ratio O/Si, respectively.
Figure 4B:
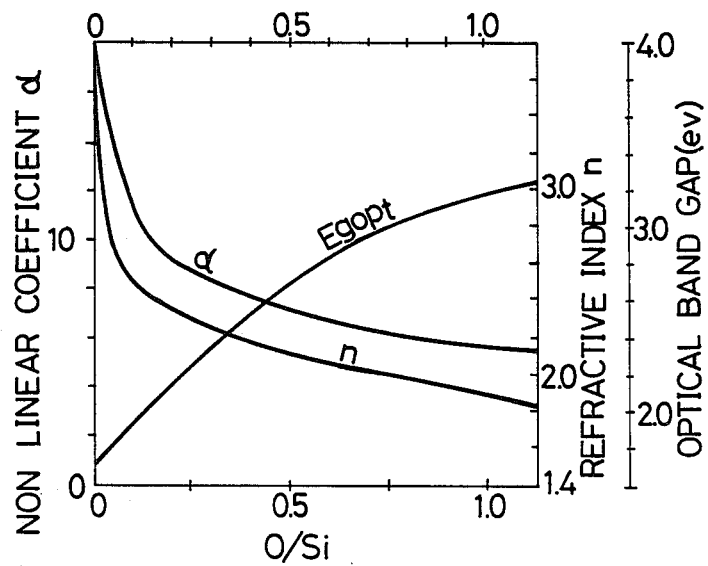

FIGS. 4a and 4b are diagrams showing the characteristics of the non-linear resistance films having different atomic composition ratios oxygen/silicon or O/Si of $SiO_x$, which contains a greater quantity of silicon atoms than that of the stoichiometric silicon dioxide and is used for the liquid crystal display device in accordance with the present invention. FIGS. 4a and 4b show the change of the non-linear resistance characteristics of the film. FIG. 4a shows the resistance-v-field intensity characteristics (hereinafter called "R-E characteristics") of the $SiO_x$ film formed by the method described above.

Curve 40 in FIG. 4a represents dark current R-E characteristics of amorphous silicon containing no oxygen atoms. Curves 41, 42 and 43 in FIG. 4a represent the R-E characteristics when the ratio O/Si is changed.

Curves 42, 43 and 44 represent the R-E characteristics of $SiO_x$ when the ratio O/Si or X is 0.17, 0.75 and 2, respectively. The change in the R-E characteristics resulting from the change of the film material can be obtained also by changing the film thickness of the amorphous silicon film. From this fact, it is assumed that the properties of the amorphous silicon film are indicated by the R-E characteristics, which does not relate to a tunnel current and a Schottky conduction mechanism.

FIG. 4b is a diagram showing the film quality of the $SiO_x$ film containing a greater ratio of silicon atoms than the stoichiometric ratio. The abscissa represents the ratio O/Si and the ordinate represents the non-linear coefficient $\alpha$ expressed by equation (7), a refractive index n and an optical band gap $Eg_{opt}$. FIG. 4b shows the result obtained by the experiments carried out by the present inventor. When the optical band gap $Eg_{opt}$ is at least 2.5 eV, the $SiO_x$ film becomes substantially transparent and the ratio O/Si at this point is from 0.4 to 0.5. In this transparent $SiO_x$ film, the nonlinear coefficient $\alpha$ is at least 7.

Next, the method of using the non-linear resistance material for the liquid crystal display device will be explained. The resistance $R_I$ of the non-linear resistance element must satisfy the conditions expressed by equations (4) through (6). Namely, a voltage $V_{ON}$ is applied at turn-on of display and the value $R_I$ at this time is from $10^7$ to $10^8$ Ohms. When the maximum voltage of $V_{OFF}$ is applied at turn-off of display, the value $R_I$ is at least $10^8$ Ohms. Furthermore, the volta $V_{NON}$ is applied during the non-selection period and the value $R_I$ at this time may be equal to the liquid crystal resistance $R_{LC}$. The power source voltage is set to be 20 V because the consumed current can be reduced and matching with other devices becomes more suitable when the liquid crystal driving voltage is as low as possible. Therefore, in the case of the non-linear resistance characteristics represented by the curve 43 in FIG. 4a, the field intensity is from 3 to 4 MEGV/cm and the value $R_I$ is $10^7$ Ohms. In other words, in order to obtain the value $R_I$ of $10^7$ ohms, the $SiO_x$ film having the greater silicon content may be formed to have a thickness of 500 Å.

In the case of the non-linear characteristics represented by the curve 41, on the other hand, the value $R_I$ at the field intensity of 1 MEGV/cm is $10^7$ Ohms. Therefore, the $SiO_x$ film may be about 2,000 Å thick in order to attain the $R_I$ value of $10^7$ Ohms.

Next, when the liquid crystal display device is driven by a 1/10 bias method determined by the afore-mentioned voltage averaging method, the maximum voltage $V_{OFF}$ at turn-off of display applied between the row electrode and the column electrode is 16 V. At this time, all the $R_I$ values of the non-linear resistance element represented by curves 40-43 are greater than $10^8$ Ohms, and when $V_{NON}$ is 4 V, all the $R_I$ values of the non-linear resistance element are at least $10^{10}$ Ohms. Therefore, the device can be driven sufficiently.

In this embodiment of the present invention, the atomic composition ratio O/Si is 0.1 and the non-linear resistance element represented by the curve 41 in FIG. 4a is used.

In a liquid display panel having a number of electrodes of 400 lines (duty ratio=1/400), the liquid crystal panel is driven by the 1/10 bias method using a driving voltage of 15 to 20 V. In this embodiment, the contrast ratio of the display surface is at least 10:1.

Figure 5A:
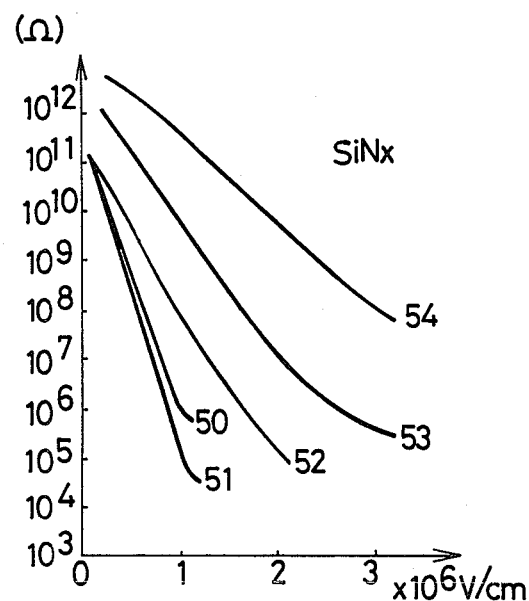
FIGS. 5a and 5b are diagrams showing the R-E characteristics of the silicon nitride film used in the liquid crystal display device of the present invention and the dependency of the film property upon the composition ratio N/Si, respectively.
Figure 5B:
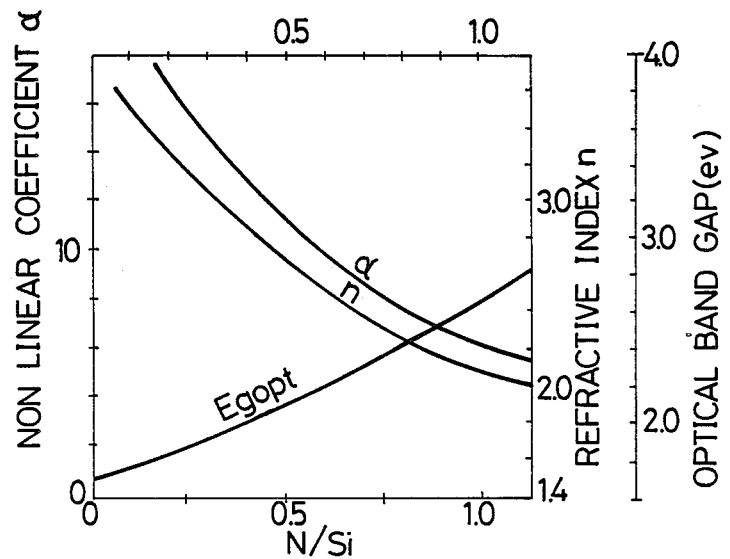

FIGS. 5a and 5b show the characteristics of non-linear resistance films having different atomic composition ratios nitrogen/silicon or N/Si of silicon nitride, which is used for the liquid crystal display device of the present invention and contains a greater quantity of silicon atoms than the stoichiometric silicon nitride and show the change of the non-linear resistance characteristics with the film quality.

FIG. 5a is a diagram showing the R-E characteristics when the ratio N/Si is changed. Curve 50 in FIG. 5a represents the R-E characteristics of amorphous silicon containing no nitrogen, and curves 51, 52, 53 and 54 represent the R-E characteristics when the ratio N/Si is smaller than 0.3, equal to 0.4, equal to 0.8 and greater than 1.0, respectively.

In FIG. 5b, the abscissa represents the N/Si ratio of the silicon nitride film and the ordinate represents the non-linear coefficient $\alpha$, the refractive index n and the optical band gap $Eg_{opt}$. When the silicon nitride film contains a greater quantity of silicon than the stoichiometric silicon nitride, the same result can be obtained in the same way as in the case of the afore-mentioned $SiO_x$ film. Incidentally, curve 51 in FIG. 5a represents the R-E characteristics of amorphous silicon containing a trace amount of nitrogen atoms. A display panel using an amorphous material which has a thickness from 5,000 to 10,000 Å can be driven sufficiently under the driving condition of the aforementioned $SiO_x$ film.

Next, the electrode width of the non-linear resistance element portion used for the liquid crystal display device will be described.

The specific dielectric constant of the amorphous material consisting principally of silicon in accordance with the present invention is from about 5 to about 7. As a condition necessary for applying a sufficient voltage to the non-linear resistance portion, the capacity $C_I$ of the non-linear element must be reduced sufficiently with respect to the capacity $C_{LC}$ of the liquid crystal, and generally must satisfy the relation $C_{LC} \geq 5C_I$. However, the resistance $R_I$ of the non-linear element is hardly relevant to this condition. When the dielectric constant of the liquid crystal is 10 and the area of pixels is 300 μm by 300 μm, $C_I$ must be set to be at least 0.1 PF because the capacity $C_{LC}$ of one pixel of the liquid crystal has the relation $C_{LC} \approx 0.5$ PF. If the film of the amorphous material is 1,000 Å thick, the overlap area of the transparent electrode 2 and the metal electrode 4 shown in FIG. 1b is 226 μm² and the line width of the electrode at the overlap portions of the two electrodes is about 15 μm. If the film of the amorphous material is 5,000 Å thick, the overlap area of the transparent electrode 2 and the metal electrode 4 is about 1,100 μm² and the line width of electrode at the overlap portion of the electrodes can be made to be more than 30 μm. Since the line width of the electrode used in the MIM system is about 6 μm, the electrodes used in the present invention can be produced by an extremely rough pattern formation method. In FIG. 1 which illustrates the embodiment of the present invention, the electrode width at the overlap portion of the two electrodes is from 10 to 15 μm.

Figure 6:
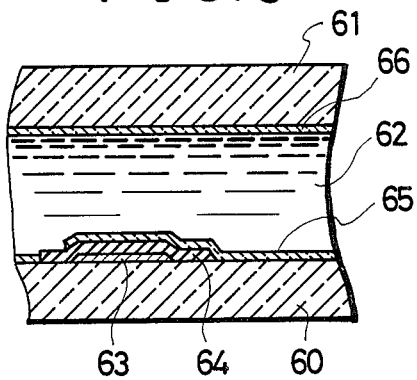
FIG. 6 is a longitudinal sectional view of the liquid crystal display device in accordance with another embodiment of the present invention.

FIG. 6 is a longitudinal sectional view showing a part of the liquid crystal display device in accordance with the present invention, and reference numerals 60 and 61 represent upper and lower substrate consisting of glass, respectively. Reference numeral 62 represents a liquid crystal layer, 63 is a metal electrode, 65 is a transparent pixel electrode consisting of ITO (indium tin oxide), 64 is an amorphous material consisting of silicon as its principal component, and 66 is a transparent electrode on the opposite side to the electrode 63.

In comparison with the embodiment shown in FIG. 1, in the embodiment shown in FIG. 6, the electrode construction of the non-linear resistance element portion is reversed, but the operation and the driving condition are the same as those of the embodiment shown in FIG. 1.

Figure 7:
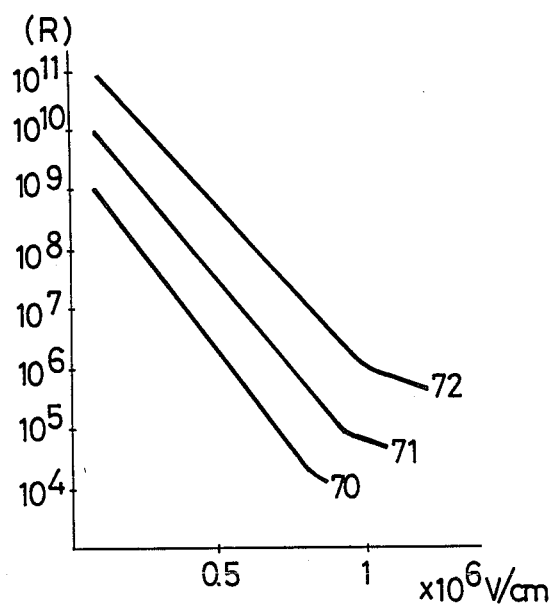
FIG. 7 is a diagram showing the R-E characteristics when P is doped into the $SiO_x$ film used in the liquid crystal display device of the present invention.

FIG. 7 shows the R-E characteristics of the amorphous material which consists of silicon as the primary component, into which phosphorus (P) is doped and which is used in the liquid crystal display device in accordance with the present invention. The resistance value of the P-doped $SiO_x$ film, which is formed by the plasma CVD method using a mixed gas of silane gas and nitrogen suboxide gas containing 0.1% to 1% of phosphine drops is remarkably changed in comparison with the resistance value of the silicon dioxide film. Curves 70 and 71 in FIG. 7 show the R-E characteristics of the $SiO_x$ films in which 1% and 0.1% of phosphine is doped into the silane gas, and curve 72 represents the R-E characteristics of a non-doped $SiO_x$ film not containing P.

Figure 8:
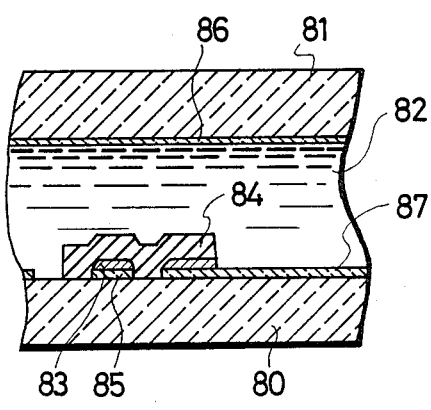
FIG. 8 is a longitudinal sectional view of the liquid crystal display device in accordance with still another embodiment of the present invention.
Figure 9:
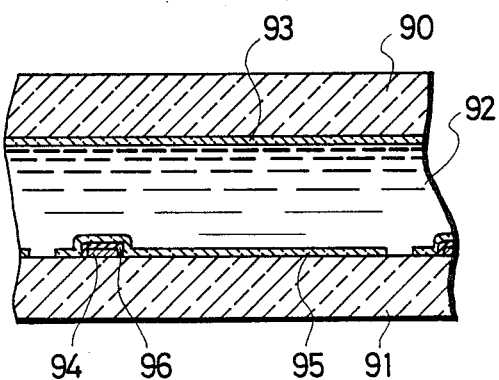
FIG. 9 is a longitudinal sectional view of a heretofore known MIM system liquid crystal display device.
Figure 10:
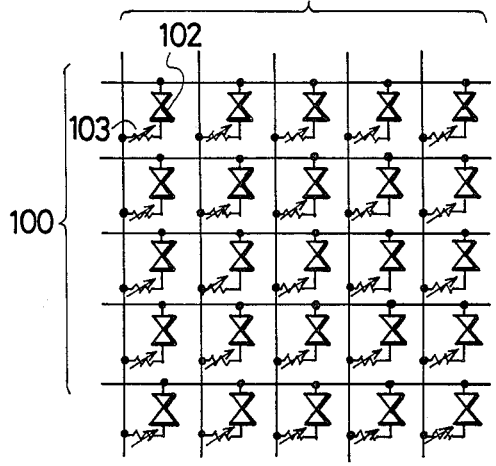
FIG. 10 is a circuit diagram of the heretofore known liquid crystal display device.
Figure 11A:
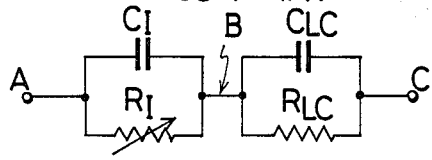
FIG. 11a is an equivalent circuit diagram of a heretofore known one pixel.
Figure 11B:
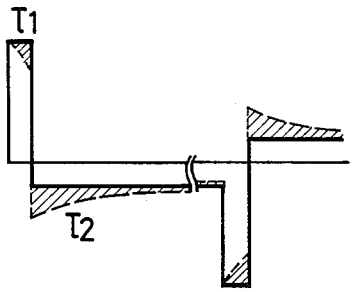
FIGS. 11b and 11c are voltage waveform diagrams at the time of turn-on and turn-off of the pixel, respectively, known in the art.
Figure 11C:
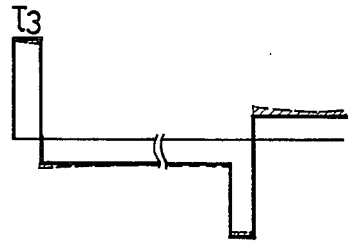

FIG. 8 is a longitudinal sectional view showing a part of the liquid crystal display device in accordance with still another embodiment of the invention which uses the P-doped amorphous $SiO_x$ film described above. In FIG. 8, reference numeral 80 is a lower transparent substrate and 81 is a transparent upper substrate. They are made of glass. Reference numerals 83 and 85 represent a chromium electrode and a transparent electrode (ITO), respectively, which together form a two-layered electrode. The electrode portion is sequentially formed by sputtering, and a pixel portion 87 and row and column electrode portions 83, 85 are separately formed by photoetching.

Next, a 1 to 5 μm thick P-doped $SiO_x$ film having a large Si content is formed on the substrate by plasma CVD. After the $SiO_x$ film is selectively removed by etching, the chromium film 83 of the pixel electrode portion is continuously removed. The non-linear resistance element consists of the row electrodes 83, 85, the pixel electrode 87 and the P-doped $SiO_x$ film 84 interposed between them. The non-linear resistance element is formed in a width of about 300 μm in the longitudinal direction of the row or column electrode. The liquid crystal display device having 200 each of the row and column electrodes formed in this manner is driven by the 1/10 bias (voltage averaging) method using a driving voltage of 20 to 50 V. In this case, a uniform display free from any irregularity can be obtained and a contrast ratio is at least 10:1.

Incidentally, phosphorus is doped into the $SiO_x$ film consisting of silicon as the principal component in FIGS. 7 and 8, but the same result can be obtained by doping P into the silicon nitride film having a greater silicon content than the stoichiometric ratio and consisting of silicon as the principal component. The same result can be obtained also when a boron-doped amorphous material in place of P by use of diboran gas.

In the embodiments described above, silicon, the amorphous oxide film and the amorphous silicon nitride film have been illustrated as the examples of the amorphous material consisting principally of silicon. A good result can also be obtained by using other amorphous materials such as a silicon nitride oxide film consisting principally of silicon In the foregoing embodiments, the amorphous material consisting principally of silicon is produced by the plasma CVD method, but it can be produced in the same way by CVD at normal or reduced pressure, sputtering using a hydrogen gas, optical CVD, and so forth.

As described above, in the liquid crystal display device using the non-linear resistance element in accordance with the present invention, the nonlinear resistance element is comprised of the amorphous material containing silicon as the primary component and the conductor, and the amorphous material consists of amorphous silicon or the silicon oxide or silicon nitride film having a greater silicon content than the stoichiometric ratio. According to this construction, the non-linear coefficient α expressed by equation (7) is from 3 to 20, and the overlap area between the two conductors used for the non-linear element can be made to be from 100 μm² to 1,000 μm².

Accordingly, the electrode can be formed in the minimum pattern width of from 10 μm to 40 μm. A display surface greater than the A4 size can be formed easily by the extremely rough pattern formation method described above. The film of the amorphous material in the present invention is generally at least 1,000 Å thick, the non-linear element is unlikely to get broken by the rubbing step at the time of liquid crystal orientation treatment, and, at the same time, the film has an extremely high breakdown voltage to static electricity. In the liquid crystal display device in accordance with the present invention, the number of production steps of the substrate having the non-linear resistance element is extremely small, and the number of masks used for the photoetching step is from 2 to 3. The registration accuracy of the pattern and the mask can be made to be ±20 μm.

As described above, the present invention provides a large scale liquid crystal display device which can be produced easily at a reduced cost of production but at a high production yield.

I claim:

1. A matrix electro-optical device comprising: a pair of substrates facing each other; an electro-optical material layer sandwiched between the substrates; a plurality of electro-optical switching elements formed on the inner surface of one of the substrates, each of the switching elements including a first electrode layer, a non-linear-resistive layer and a pixel electrode electrically connected to the first electrode layer through the non-linear-resistive layer, the non-linear resistive layer substantially comprised of an amorphous material composed principally of silicon and oxygen, or principally of silicon and nitrogen, or principally of silicon, oxygen and nitrogen, each of these constituents having a ratio less than 90 atomic percent; and a second electrode layer formed on the inner surface of the other of the substrates.

2. A matrix electro-optical device as claimed in claim 1; wherein the matrix electro-optical device comprises a matrix display device having a plurality of electro-optical switching elements arranged in a matrix.

3. A matrix electro-optical device as claimed in claim 1; wherein the first electrode layer is composed of metal.

4. A matrix electro-optical-device as claimed in claim 1; wherein the electro-optical material comprises a liquid crystal.

5. A matrix electro-optical device as claimed in claim 1; including means for driving the matrix electro-optical device in a multiplex mode.

6. A matrix electro-optical device as claimed in claim 1; wherein the non-linear-resistive layer is comprised of a light-transmissive material.

7. A matrix electro-optical device as claimed in claim 1; wherein the amorphous material is non-stoichiometric.

8. A matrix electro-optical device as claimed in claim 1; wherein the non-linear-resistive layer is a single layer.

9. A matrix electro-optical device as claimed in claim 1; wherein the amorphous material further contains hydrogen.

10. A matrix electro-optical device as claimed in claim 1; wherein the amorphous material further contains phosphorus or boron.

11. A matrix electro-optical device as claimed in claim 1; wherein the amorphous material is essentially composed of silicon nitride having an atom composition ratio N/Si which is more than 0.1 and less than 1.5.

12. A matrix electro-optical device as claimed in claim 1; wherein the amorphous material is essentially composed of silicon oxide having an atom composition ratio O/Si which is more than 0.1 and less than 2.0.

13. A matrix electro-optical device as claimed in claim 1; wherein the non-linear-resistive layer comprises a chemically-vapor-deposited layer.

14. A matrix electro-optical device as claimed in claim 1; wherein the amorphous material is essentially composed of silicon oxide, silicon nitride or silicon oxide nitride having a silicon content greater than a stoichiometric ratio.

15. A matrix electro-optical device as claimed in claim 11; wherein the non-linear-resistive layer has a thickness of 400Å to 10000 Å.

16. A matrix electro-optical device as claimed in claim 1; wherein a portion of the first electrode layer and a portion of the pixel electrode are overlapped with each other in a thickness direction through the non-linear-resistance layer.

17. A matrix electro-optical device as claimed in claim 16; wherein the pixel electrode is disposed in contact with one of the substrates, the non-linear-resistive layer is disposed on the pixel electrode, and the first electrode layer is disposed on the non-linear-resistive layer.

18. A matrix electro-optical device as claimed in claim 16; wherein the first electrode layer is disposed in contact with one of the substrates, the non-linear-resistive layer is disposed on the first electrode layer, and the pixel electrode is disposed on the non-linear-resistive layer.

19. A matrix electro-optical device as claimed in claim 1,; wherein a side surfaces of the first electrode layer and a side surface of the pixel electrode are disposed opposite one another in a horizontal direction and connected to each other through the non-linear-resistive layer.

20. A matrix electro-optical device as claimed in claim 19; wherein the opposed side surfaces of the first electrode layer and the pixel electrode are separated from each other a distance at least 1 micron.

21. A matrix electro-optical device as claimed in claim 1; wherein the non-linear-resistive layer comprises a layer formed by means of plasma CVD, low pressure CVD, normal pressure CVD, optical CVD or sputtering.

22. In an electro-optical device having a plurality of electro-optical elements arranged in a matrix and optical activated selectively in response to voltage pulses applied thereto, each electro-optical element comprising: first and second electrode layers opposed to each other for selectively receiving thereacross a voltage pulse; a third electrode layer adjacent to the first electrode layer and in opposed relation to the second electrode layer; an electro-optical layer interposed between the second and third electrode layers and optical activated when electrically charged through the third electrode layer; and a non-linear-resistance layer disposed between the first and third electrode layers and operative when the voltage pulse is applied across the first and second electrode layers to increase its electro-conductivity for electrically connecting the first electrode layer to the third electrode layer to thereby electrically charge the electro-optical layer in response to the applied voltage pulse, the non-linear-resistive layer being comprised of an amorphous material composed principally of silicon and oxygen, or principally of silicon and nitrogen, or principally of silicon, oxygen and nitrogen, each of these constituents having a ratio less than 90 atomic percent.

23. An electro-optical device as claimed in claim 22, wherein the non-linear-resistive layer has a thickness from 400Å to 10,000Å.

24. An electro-optical device as claimed in claim 22; wherein the non-linear-resistive layer is sandwiched between the first and third electrode layers.

25. An electro-optical device as claimed in claim 24; wherein the first electrode layer is disposed on top of the non-linear-resistive layer.

26. An electro-optical device as claimed in claim 24; wherein the first electrode layer is disposed at the bottom of the non-linear-resistive layer.

27. An electro-optical device as claimed in claim 22; including a substrate having the first and third electrode layers formed thereon in on-overlapping relation and having a non-linear-resistive layer disposed between the first and third electrode layers.

28. An electro-optical device as claimed in claim 27, wherein the first and third electrode layers are separated a distance more than 1 micron.

29. An electro-optical device as claimed in claim 22; wherein the non-linear-resistive layer is a single layer.

30. An electro-optical device as claimed in claim 22; wherein the amorphous material further contains hydrogen.

31. An electro-optical device as claimed in claim 22; wherein the amorphous material further contains phosphorus or boron.

32. An electro-optical device as claimed in claim 22; wherein the amorphous material is essentially composed of silicon nitride having an atom composition ratio N/Si which is more than 0.1 and less than 1.5.

33. An electro-optical device as claimed in claim 22; wherein the amorphous material is essentially composed of silicon oxide having an atom composition ratio O/Si which is more than 0.1 and less than 2.0.

34. An matrix electro-optical device comprising: a pair of opposed substrates; an electro-optical material layer sandwiched between the substrates and having optical properties which vary by applying a voltage thereacross; a plurality of electro-optical switching elements formed on the inner surface of one of the substrates, each of the switching elements including a first electrode layer defining one of row and column electrodes, a non-linear-resistive layer and a pixel electrode at least partly overlapping the first electrode layer and electrically connected to the first-electrode layer through the non-linear-resistive layer, the non-linear-resistive layer being substantially comprised of an amorphous material composed of plural constituents each of which is less than 90 atomic percent, and wherein the atomic ratio of the plural constituents, the overlap area of the first and pixel electrodes, and the thickness of the non-linear-resistive layer are set so that the current-voltage characteristics and capacitance of the switching elements are optimized with respect to the resistance and capacitance of the electro-optical material layer; and a second electrode layer defining the other of the row and column electrodes and formed on the inner surface of the other of the substrates.

35. A matrix electro-optical device as claimed in claim 34, wherein one of the constituents is silicon.

36. A matrix electro-optical device as claimed in claim 35; wherein another of the constituents is oxygen or nitrogen.

37. A matrix electro-optical device as claimed in claim 36; wherein the atomic ratio of oxygen to silicon is more than 0.1 and less than 2.0, and the atomic ratio of nitrogen to silicon is more than 0.1 and less than 1.5.

38. A matrix electro-optical device as claimed in claim 36, wherein the atomic ratio of oxygen to silicon is more than 0.1 and less than 0.75, and the atomic ratio of nitrogen to silicon is more than 0.3 and less than 1.0.

39. A matrix electro-optical device as claimed in claim 34; wherein the plural constituents contain silicon, oxygen and nitrogen.

40. A matrix-optical device as claimed in claim 39 wherein the atomic ratio of oxygen plus nitrogen to silicon is more than 0.1 and less than 1.5.

41. A matrix electro-optical device as claimed in claim 34; wherein the electro-optical material comprises liquid crystal.

42. A matrix electro-optical device comprising: a pair of opposed substrates; an electro-optical material layer sandwiched between the substrates and having optical properties which vary by applying a voltage thereacross; a plurality of electro-optical switching elements formed on the inner surface of one of the substrates, each of the switching elements including a first electrode layer defining one of row and column electrodes, a non-linear-resistive layer and a pixel electrode at least partly overlapping the first electrode layer and electrically connected to the first electrode layer through the non-linear-resistive layer, the non-linear-resistive layer being substantially comprising of an amorphous material composed of plural constituents each of which is less than 90 atomic percent; and a second electrode layer defining the other of the row and column electrodes and formed on the inner surface of the other of the substrates; wherein the atomic ratio of the plural constituents, the overlap area of the first and pixel electrodes, and the thickness of the non-linear-resistive layer are set so that the following relationships are satisfied:

$$10^7 < R_I(V_{ON}) < 2 \times 10^8$$

$$3 \times 10^9 < R_I(V_{NON}) R_{LC}/[R_I(V_{NON}) + R_{LC}]$$

$$R_I(V_{OFF}) > 2 \times 10^8$$

$$C_i < C_{LC}/5$$

where $R_I(V_{ON})$, $R_I(V_{NON})$ and $R_I(V_{OFF})$ denote the resistances of the switching elements when a turn-on voltage, a non-selection voltage and a turn-off voltage area applied respectively, $C_I$ denotes the capacitance of the switching elements, and $R_{LC}$ and $C_{LC}$ denote the resistance and capacitance of the electro-optical material layer respectively.

43. A matrix electro-optical device comprising: a pair of opposed substrates; an electro-optical material layer sandwiched between the substrates and having optical properties which vary by applying a voltage thereacross; a plurality of electro-optical switching elements formed on the inner surface of one of the substrates, each of the switching elements including a first electrode layer defining one of row and column electrodes, a non-linear-resistive layer and a pixel electrode electrically connected to the first electrode layer through the non-linear-resistive layer, the non-linear-resistive layer being substantially comprised of an amorphous material composed of plural constituents each of which is less than 90 atomic percent; and a second electrode layer defining the other of the row and column electrodes and formed on the inner surface of the other of the substrates.

44. A matrix electro-optical device as claimed in claim 43; wherein one of the constituents is silicon.

45. A matrix electro-optical device as claimed in claim 44; wherein another of the constituents is oxygen or nitrogen.

46. A matrix electro-optical device as claimed in claim 45 wherein the atomic ratio of oxygen to silicon is more than 0.1 and less than 2.0, and the atomic ratio of nitrogen to silicon is more than 0.1 and less than 1.5.

47. A matrix electro-optical device as claimed in claim 45; wherein the atomic ratio of oxygen to silicon is more than 0.1 and less than 0.75, and the atomic ratio of nitrogen to silicon is more than 0.3 and less than 1.0.

48. A matrix electro-optical device as claimed in claim 43; wherein the plural constituents contain silicon, oxygen and nitrogen.

49. A matrix electro-optical device as claimed in claim 43; wherein the atomic ratio of oxygen plus nitrogen to silicon is more than 0.1 and less than 1.5.

* * * * *